(No Model.)

O. KAISER.
FLOWER POT.

No. 314,682. Patented Mar. 31, 1885.

WITNESSES:
A. P. Grant
W. F. Kirchen

INVENTOR:
Otto Kaiser,
BY John A. Wiedersheim
ATTORNEY.

UNITED STATES PATENT OFFICE.

OTTO KAISER, OF JARRETTOWN, PENNSYLVANIA.

FLOWER-POT.

SPECIFICATION forming part of Letters Patent No. 314,682, dated March 31, 1885.

Application filed March 29, 1884. (No model.)

*To all whom it may concern:*

Be it known that I, OTTO KAISER, a citizen of the United States, residing at Jarrettown, in the county of Montgomery and State of Pennsylvania, have invented a new and useful Improvement in Flower-Pots, which improvement is fully set forth in the following specification and accompanying drawings, in which—

Figure 1:
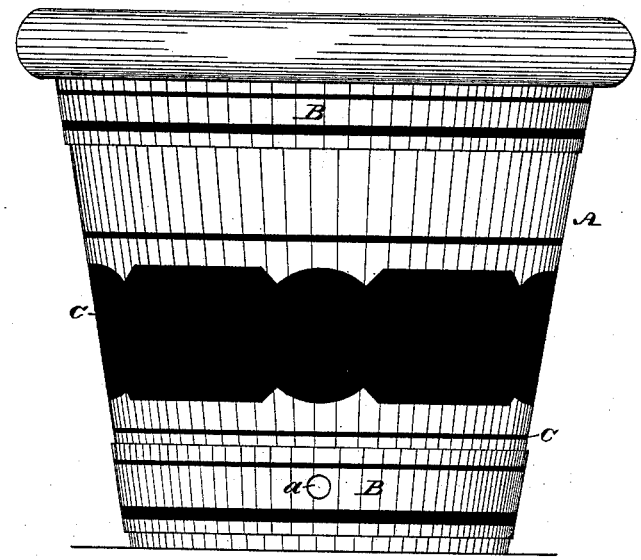
Figure 2:
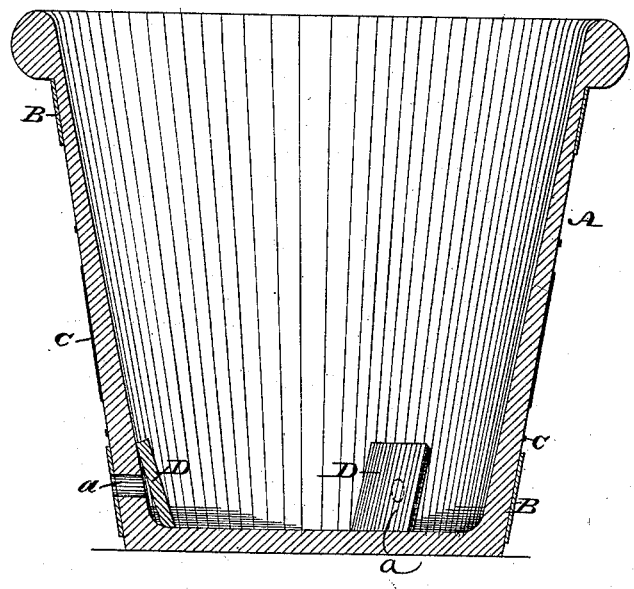

Figure 1 is a side elevation of a flower-pot embodying my invention. Fig. 2 is a vertical section thereof.

Similar letters of reference indicate corresponding parts in the two figures.

My invention consists of improvements in flower-pots, as will be hereinafter fully set forth and definitely claimed.

Referring to the drawings, A represents an ordinary flower-pot formed of unglazed or unvitrified clay, which, as is well known, is exceedingly friable.

In order to strengthen the pot, I provide bands B, of metal, and apply the same around the pot, at the top and bottom thereof, and force them thereon or cement them thereto, so as to be securely retained in position, by which means the pot is braced and stiffened, and better enabled to endure blows, handling, and transportation, its durability being also increased. In the side of the pot I form openings *a*, which, it will be seen, are above the bottom thereof, so that sufficient water may remain in the bottom to keep the earth in the pot properly moistened, the excess escaping through said openings.

Owing to the tendency of the material of the pot to absorb water, and thus draw the same from the earth therein and allow it to evaporate on the surface or cause it to trickle down the same, (while this is advisable to a certain extent only, it being practical to have the pot remain somewhat damp,) I design to limit the amount of absorption, and consequently loss of the water, by applying to a portion of the exterior surface a coating of oil-paint, as at C, whereby the surface is painted in some places and left unpainted in other places. The coating of paint is applied about the middle of the pot, and as it closes the pores of the earthenware thereat it is evident that the pot is deprived of much of its tendency to carry off the water through its sides. Within the pot at or near the bottom thereof are secured guards D, which lap the inner ends of the openings *a*, and are set back slightly therefrom, acting as deflectors for preventing the rapid escape of water through said openings *a*, and presenting a barrier to the entrance of worms. They also serve to prevent the earth from closing the openings *a* and being washed out of the same.

Having thus described my invention, what I claim as new, and desire to secure by Letters Patent, is—

1. A flower-pot having a closed bottom and an opening in its side, and a shield or guard rigidly secured to said side over said opening, having an open space between said guard and side, substantially as and for the purpose set forth.

2. An improved flower-pot formed of unvitrified material, provided with a metallic band encircling a portion of its periphery, and having another portion thereof covered with paint, the said flower-pot also having in its side an opening, which is protected on the inner side by a shield or guard rigidly secured to the side, leaving a space between said side and guard, substantially as and for the purpose set forth.

OTTO KAISER.

Witnesses:
 JOHN A. WIEDERSHEIM,
 A. P. GRANT.